(12) United States Patent
Lin

(10) Patent No.: US 9,772,148 B2
(45) Date of Patent: Sep. 26, 2017

(54) DISPLAY DEVICE

(71) Applicants:QISDA (SUZHOU) CO., Ltd., Jiangsu (CN); Qisda Corporation, Taoyuan County (TW)

(72) Inventor: Chi-Cheng Lin, Taoyuan County (TW)

(73) Assignees: Qisda (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 0 days.

(21) Appl. No.: 15/247,953

(22) Filed: Aug. 26, 2016

(65) Prior Publication Data

US 2017/0064880 A1 Mar. 2, 2017

(51) Int. Cl.
*H05K 7/20* (2006.01)
*F28F 13/00* (2006.01)
*G06F 1/20* (2006.01)

(52) U.S. Cl.
CPC ............... *F28F 13/00* (2013.01); *G06F 1/20* (2013.01)

(58) Field of Classification Search
CPC . G06F 1/181–1/182; H05K 7/20218–7/20381; H05K 7/20409–7/20418; H05K 7/20009–7/202; H01L 23/367–23/3677; H01L 23/473; H01L 23/46–23/467
USPC ...... 361/676–678, 679.46–679.54, 688–723; 165/80.1–80.5, 104.33, 185; 174/15.1–15.3, 16.1–16.3, 547, 548; 257/712–722, E23.088; 24/453, 458–459; 454/184; 312/236
See application file for complete search history.

(56) References Cited

U.S. PATENT DOCUMENTS

2007/0103864 A1* 5/2007 Kim .................. H05K 7/20145
361/679.48
2007/0103866 A1* 5/2007 Park .................. H05K 7/20972
361/695

(Continued)

FOREIGN PATENT DOCUMENTS

TW  200803709 A  1/2008

OTHER PUBLICATIONS

Office action of counterpart application by Taiwan IP Office dated Jul. 7, 2016.

*Primary Examiner* — Anthony Haughton
*Assistant Examiner* — Razmeen Gafur

(57) ABSTRACT

A display device includes a display module, a support housing, and a heat dissipating module. The display module has a back surface, wherein at least a portion of the back surface has a first heat dissipating block. The support housing is disposed opposite the back surface. The support housing sandwiches with the back surface a mezzanine space for disposing the first dissipating module. The first heat dissipating module includes a first heat dissipating body and a first elastic unit. The first heat dissipating module has a first heat exchange surface and a first pressure receiving surface facing away from each other, wherein the first heat exchange surface is heat exchange connected to the first heat dissipating block. The first elastic unit disposed compressed between the first pressure receiving surface and the support housing, wherein with the support housing as a source of reaction force, the first elastic unit provides the first pressure receiving surface with a first pressing force.

11 Claims, 5 Drawing Sheets

(56) References Cited

U.S. PATENT DOCUMENTS

| | | | |
|---|---|---|---|
| 2007/0127198 A1* | 6/2007 | Cho | H05K 5/02 361/679.22 |
| 2007/0127215 A1* | 6/2007 | Jeong | H05K 7/20963 361/710 |
| 2007/0139885 A1* | 6/2007 | Ouyang | G06F 1/189 361/699 |
| 2007/0153454 A1* | 7/2007 | Chang | H05K 7/20963 361/679.22 |
| 2007/0211431 A1 | 9/2007 | Munch et al. | |
| 2007/0274051 A1* | 11/2007 | Horng | G02F 1/133603 361/710 |
| 2008/0062628 A1* | 3/2008 | Bang | H05K 5/0217 361/679.01 |
| 2008/0068806 A1* | 3/2008 | Han | H05K 7/20963 361/714 |
| 2008/0068807 A1* | 3/2008 | Horng | H05K 7/20972 361/719 |
| 2008/0083527 A1* | 4/2008 | Horng | H05K 7/20972 165/80.3 |
| 2008/0117575 A1* | 5/2008 | Kang | G06F 1/1601 361/679.01 |
| 2008/0123270 A1* | 5/2008 | Kim | H05K 7/20963 361/679.01 |
| 2008/0151502 A1* | 6/2008 | Shives | H05K 7/20963 361/704 |
| 2008/0198555 A1* | 8/2008 | Yamashita | H01L 23/4006 361/712 |
| 2008/0259556 A1* | 10/2008 | Tracy | G06F 1/1632 361/679.49 |
| 2009/0009974 A1* | 1/2009 | Tseng | G02F 1/133382 361/711 |
| 2009/0168357 A1* | 7/2009 | Suzuki | H05K 5/02 361/709 |
| 2009/0175002 A1* | 7/2009 | Tseng | H05K 7/20972 361/694 |
| 2009/0296353 A1* | 12/2009 | Kim | H05K 7/20963 361/711 |
| 2010/0014256 A1* | 1/2010 | Lee | H05K 7/20963 361/721 |
| 2010/0079942 A1* | 4/2010 | Yamamoto | G02F 1/133308 361/690 |
| 2011/0051369 A1* | 3/2011 | Takahara | H05K 7/2099 361/696 |
| 2011/0075363 A1* | 3/2011 | Nakamichi | G09F 9/35 361/696 |
| 2011/0110046 A1* | 5/2011 | Itoh | G02F 1/133308 361/709 |
| 2012/0170223 A1* | 7/2012 | Yoon | H05K 7/20963 361/718 |
| 2013/0070172 A1* | 3/2013 | Ooe | H04N 5/64 348/843 |
| 2013/0088836 A1* | 4/2013 | Kuroda | H01L 23/42 361/700 |
| 2013/0162506 A1* | 6/2013 | Kim | G06F 1/32 345/82 |
| 2013/0294030 A1* | 11/2013 | Wang | H05K 7/20336 361/700 |
| 2013/0329366 A1* | 12/2013 | Wang | H05K 7/20963 361/704 |
| 2014/0002750 A1* | 1/2014 | Hamada | H05K 7/202 348/725 |
| 2014/0029204 A1* | 1/2014 | Atkinson | H05K 7/20518 361/714 |
| 2014/0036448 A1* | 2/2014 | Kim | H04N 5/64 361/700 |
| 2016/0135331 A1* | 5/2016 | Wu | G06F 3/041 361/700 |

* cited by examiner

DISPLAY DEVICE

BACKGROUND

1. Technical Field

The present disclosure generally relates to a display device and heat dissipating system thereof; particularly, the present disclosure relates to a display device dissipating heat off backside of display module and heat dissipating system thereof.

2. Description of the Related Art

In recent years, display devices have been widely adopted for use in various electronic products, such as mobile phones, notebook computers, digital cameras, navigation devices, and medical equipment. In addition, display devices also are typically used as a single independent display, such as a television or computer monitor. Display devices that are often seen include liquid crystal display devices, organic light-emitting diode display devices, and other active or passive display devices.

No matter which type of display device is involved, heat dissipation has always been a particular problem of concern. For instance, fans or other related heat dissipation structures need to be installed with regards to light sources, circuits, and other sources of heat. In terms of liquid crystal display devices as an example, backlight modules are typically a source of heat generation. In addition, as panel resolution and display surface area increases, circuit power has also correspondingly increased, wherein more heat is generated that needs to be removed. Traditionally, heat dissipating devices are installed on a backside of display panels. However, if the backside of the display panel sustains excessive forces or pressure, abnormal image display may occur or even damage to the display panel may be incurred. Consequently, heat dissipating devices cannot conduct heat on the backside of display panels. Unless large amounts of fans or related devices are used, heat dissipating effects would not be able to satisfy heat dissipating requirements for normal operation of the display device. However, for electronic devices with special requirements, such as medical equipments, the use of large amounts of fans would create excessive noise and thus would not satisfy demand requirements.

SUMMARY

It is an objective of the present disclosure to provide a display device and heat dissipating system thereof having better heat dissipating efficiency.

It is another objective of the present disclosure to provide a display device and heat dissipating system thereof that can decrease noise resulting from fans.

In one aspect of the present invention, the display device includes a display module, a support housing, and a heat dissipating module. The display module has a back surface, wherein at least a portion of the back surface has a first heat dissipating block. When the display module is generating heat, for instance when a backlight module or any other inner portion circuit module generates heat, this heat can be conducted out through the first dissipating block. The support housing is disposed opposite the back surface. In other words, the support housing supports the display module from the backside of the display module. The support housing sandwiches with the back surface a mezzanine space for disposing the first dissipating module. The first heat dissipating module includes a first heat dissipating body and a first elastic unit. The first heat dissipating module has a first heat exchange surface and a first pressure receiving surface facing away from each other, wherein the first heat exchange surface is heat exchange connected to the first heat dissipating block. Through the above design, heat generated by the display module can be conducted away from the back surface through the first heat exchange surface and accomplish the effect of heat dissipation.

The first elastic unit is disposed compressed between the first pressure receiving surface and the support housing. Since the first elastic unit is already pre-compressed, it has already stored an elastic potential energy and can use the support housing as a source of reaction force to provide a first pressing force on the first pressure receiving surface. Through the first pressing force, the connection between the first heat exchange surface and the first heat dissipating block can be made tighter to increase efficiency of heat conduction.

DETAILED DESCRIPTION OF THE PREFERRED EMBODIMENT

The present invention provides a display device having a heat dissipating structure, wherein the display device can include non self-luminous and self-luminous display device. Non self-luminous display device can include liquid crystal display devices, whereas self-luminous display device can include organic light-emitting diode display devices. The display device preferably has higher pixel configuration, for instance medical grade display devices. In addition, the heat dissipating structure provided by the present invention can be used with fans or any other heat dissipating devices while still being able to decrease noise through decreasing the amount of use of fans.

Figure 1:
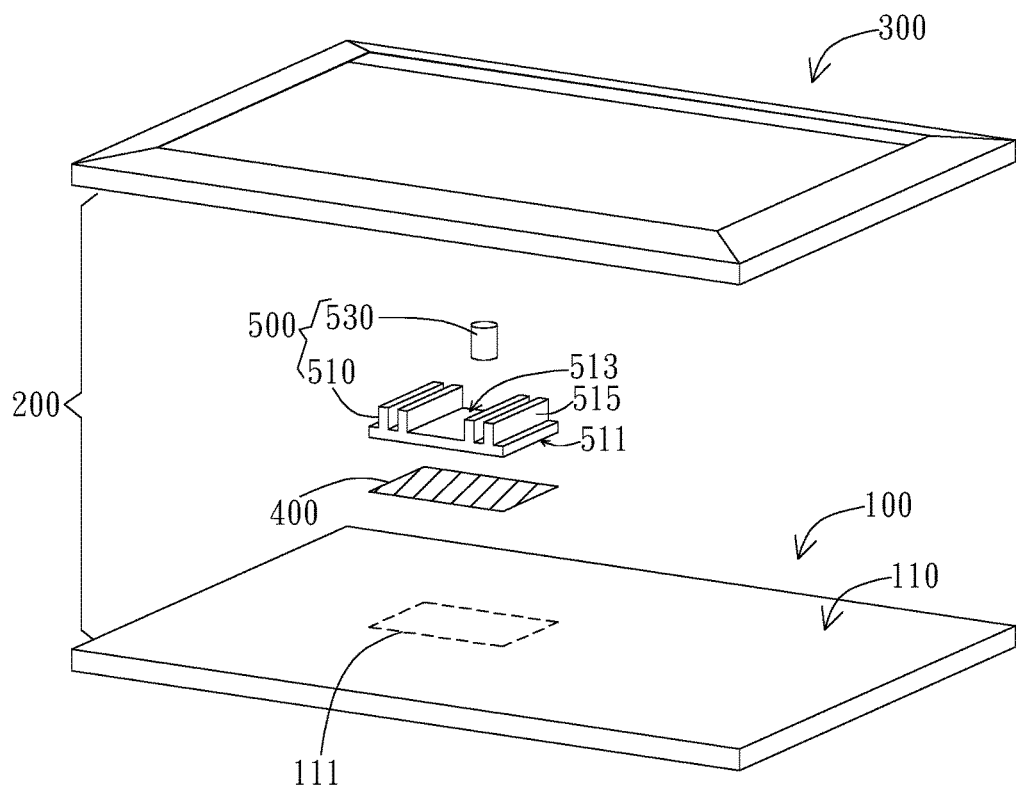
FIG. 1 is an embodiment of the display device of the present invention.

As illustrated in FIG. 1, the display device includes a display module 100, a support housing 300, and a first dissipating module 500. The display module 100 has a back surface 110, wherein a portion of the back surface 110 is a first heat dissipating block 111. In one embodiment, the display module 100 is a liquid crystal display device having a backlight module. Therefore, the back surface 110 would then preferably be the bottom surface of the backlight module. The display module 100 will generate heat when displaying images. For instance, the backlight module or any other internal circuit modules may generate heat. This heat can be conducted out by way of the first heat dissipating block 111. The first heat dissipating block 111 includes at least a portion of the surface area of the back surface 110. In a more extreme embodiment, the first heat dissipating block 111 may also encompass the entirety of back surface 110. When the display module 100 is in operation, in contrast to areas other than the back surface 110, the first heat dissipating block 111 preferably has a higher operating temperature.

Figure 2:
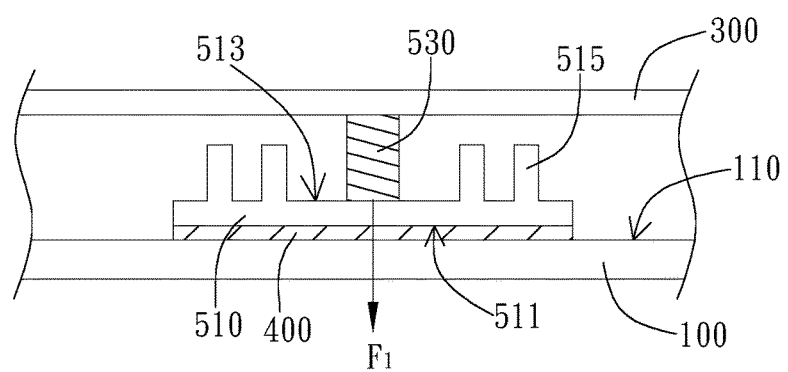
FIG. 2 is a side cross-sectional view of the embodiment of FIG. 1.

The support housing 300 is disposed opposite the back surface 110. In other words, the support housing 300 supports the display module 100 from the back of the display module 100. As shown in FIGS. 1 and 2, a mezzanine space 200 is sandwiched between the support housing 300 and the back surface 110 for a first heat dissipating module 500 to be disposed. The support housing 300 may include plate outer housing formed of metallic or plastic materials, or may also include frame structures assembled from ribs/beams and outer frame. The first heat dissipating module 500 includes a first heat dissipating body 510 and a first elastic unit 530. The first heat dissipating body 510 is preferably metallic or formed of any other materials with good heat conduction properties. In this manner, heat energy may be conducted out or away from the first heat dissipating block 111. As shown in FIGS. 1 and 2, the first heat dissipating body 510 has a first heat exchange surface 511 and first pressure receiving surface 513 facing away from each other, wherein the first heat exchange 511 is heat exchange connected to the first heat dissipating block 111. Through this design, heat energy generated by the display module 100 may be conducted away from the back surface 110 via the first heat exchange surface 511 to accomplish the effect of dissipating heat.

The connection between the first heat exchange surface 511 and the first heat dissipating block 111 preferably includes direct or indirect connection. For instance, the connection may be direct contact or connection via the heat conducting medium layer 400 shown in the present embodiment. As illustrated in FIG. 2, heat conducting medium layer 400 is disposed between the first heat exchange surface 511 and the first heat dissipating block 111, and is respectively adhered to the first heat exchange surface 511 and the first heat dissipating block 111. The heat conducting medium layer 400 is preferably respectively more elastic than the first heat exchange surface 511 and the first heat dissipating block 111. By way of small crevices, dents, or non-uniform areas between the first heat exchange surface 511 and the first heat dissipating block 111, heat conductivity effects may be increased. In addition, a plurality of heat dissipating fins may be disposed on the first pressure receiving surface 513 to increase heat dissipating effects.

As illustrated in FIGS. 1 and 2, a first elastic unit 530 is disposed compressed between the first pressure receiving surface 513 and the support housing 300. Since the first elastic unit 530 is already pre-compressed, it already has elastic potential energy stored, wherein the support housing 300 may be used as a source of reaction force to exert a first pressing force $F_1$ on the first pressure receiving surface 513. By way of exerting the first pressing force $F_1$, the connection between the first heat exchange surface 511 and the first heat dissipating block 111 may be made tighter or closer. For instance, the thickness of the heat conducting medium layer 400 may be compressed or density increased to further increase the efficiency of heat conduction. The first elastic unit 530 preferably includes coil springs, elastic rubber, or any other components that can store elastic potential energy through pre-compression.

Figure 3:
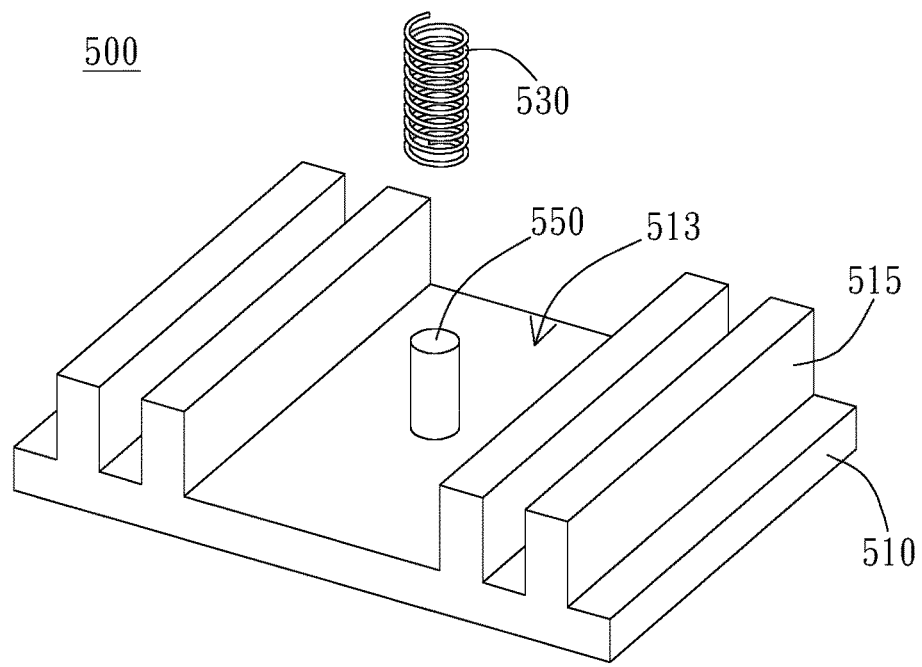
FIG. 3 is another embodiment of the first heat dissipating module.

In the embodiment shown in FIG. 3, the first heat dissipating body 510 has a guide post 550 disposed on the first pressure receiving surface 513. When the first elastic unit 530 is a coil spring, the first elastic unit 530 may be fitted over the guide post 550. Through this setup, the first elastic unit 530 can be ensured to provide the first pressing force along the extending direction of the guide post 550 and decrease the chance of the force being exerted off at an angle. In addition, when only the first elastic unit 530 and the guide post 550 are disposed on the first pressure receiving surface 513, the guide post 550 is preferably disposed at the center of the first pressure receiving surface 513. When there are multiple first elastic units 530 and guide posts 550, the center position between each guide posts 550 preferably overlaps with the center of the first pressure receiving surface 513 such that a more uniform pressure or force may be exerted on the first heat exchange surface 511.

Figure 4:
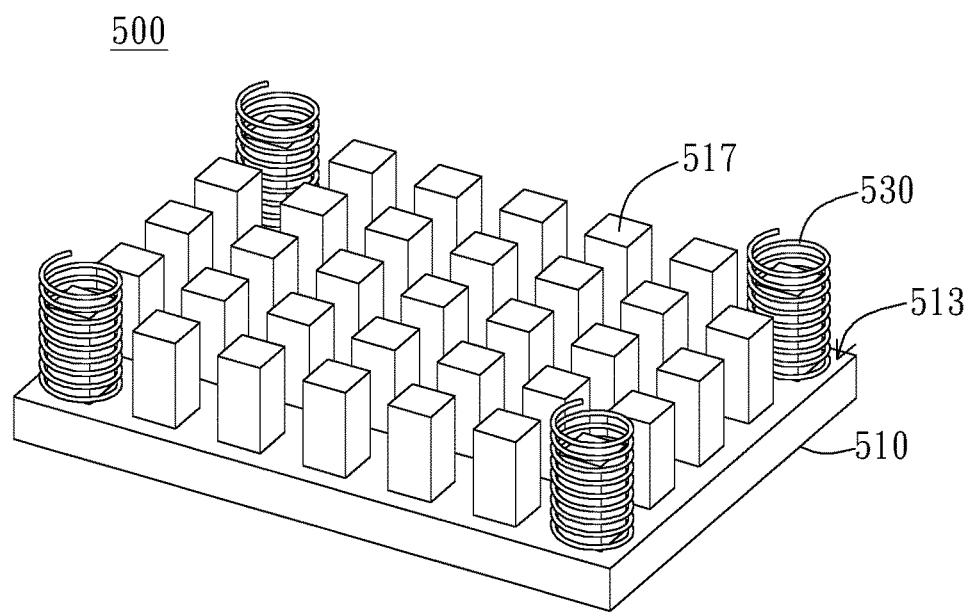
FIG. 4 is another embodiment of the first heat dissipating module.

FIG. 4 is another embodiment of the first heat dissipating body 510. In the present embodiment, the first heat dissipating body 510 has a plurality of heat dissipating posts 517 disposed on the first pressure receiving surface 513. Air current passing through between adjacent heat dissipating posts 517 will carry away heat energy from the heat dissipating posts 517 to accomplish the effect of heat dissipation. Different from the previous embodiment of the heat dissipating fins, the heat dissipating posts 517 comparatively does not have a particular direction of heat dissipation. In other words, no matter if the display device is upright or horizontally disposed, the heat dissipating posts 517 can provide space and passages for different directions of air current for heat dissipation. In addition, in the present embodiment, when the first elastic unit 530 is a spring coil, the heat dissipating post 517 may be provided to the first elastic unit 530 as a guide post to be fitted over such that additional designs of guide posts would not be needed. In this manner, the number or positions of the first elastic units 530 may be increased or decreased at any time.

Figure 5A:
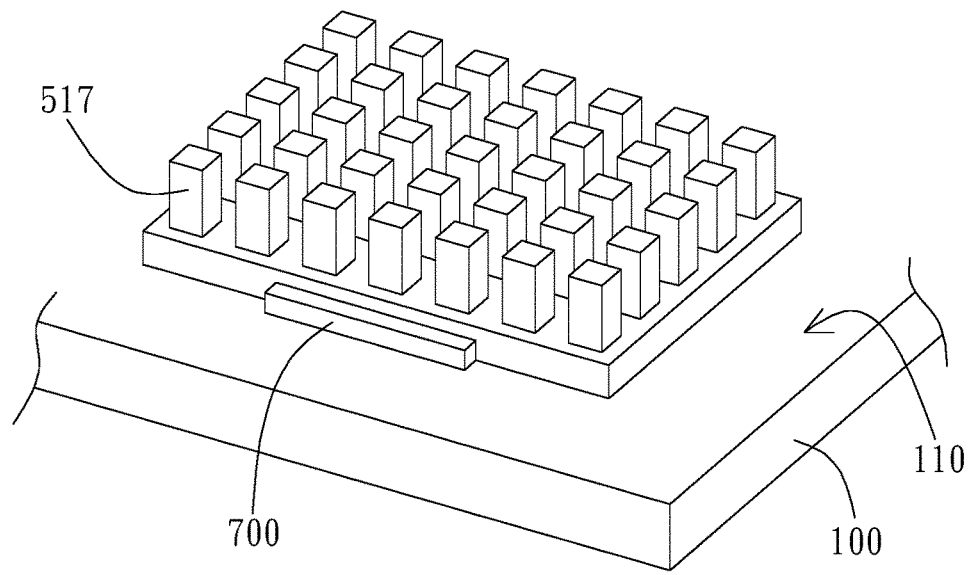
FIG. 5A is a variation embodiment of the display device.
Figure 5B:
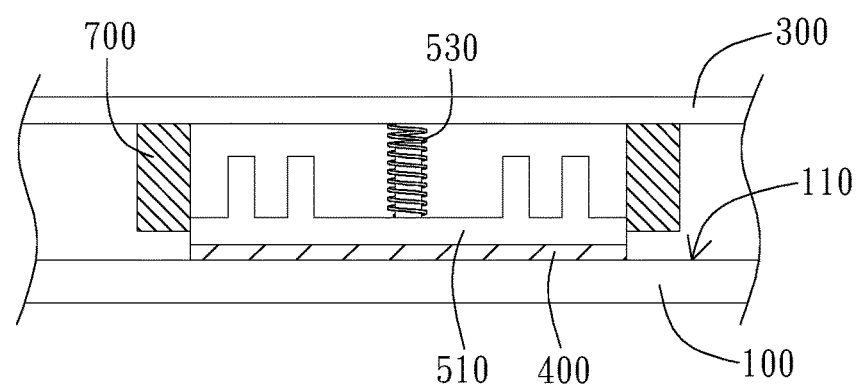
FIG. 5B is another embodiment of FIG. 5A.

In the embodiment of FIG. 5A, the display device includes at least one position limiting unit 700 disposed on a side of the first heat dissipating body 510. In the present embodiment, the position limiting unit 700 is disposed on the back surface 110 and limits or restricts the displacement of the first heat dissipating body 510 on a plane dimension parallel to the back surface 110. However, in other different embodiment, the position limiting unit 700 can also be disposed on the inner surface of the support housing 300, as shown in FIG. 5B. In addition, when there is a plurality of position limiting units 700, they may be disposed on the different corresponding sides of the first heat dissipating body 510. As shown in FIG. 5A, the position limiting unit 700 is formed as a strip shape and extends parallel to a side of the first heat dissipating body 510. Through this design, the first heat dissipating body 510 may be restricted the displacement towards the position limiting unit 700 due to how the first heat dissipating body 510 receives the first pressing force of the first elastic unit 530. As well, since the position limiting unit 700 is a strip shape, a wider surface area can be provided for position limiting effects, wherein the chances of the first heat dissipating body 510 rotating due to being blocked may be decreased. However, in other different embodiments, the position limiting unit 700 may be formed as one or more bumps to also provide similar effects. The position limiting unit 700 may be formed of rubber or other plastic materials, and may be adhered on the back surface 110 or the support housing 300 (but not limited or restricted to this).

Figure 6:
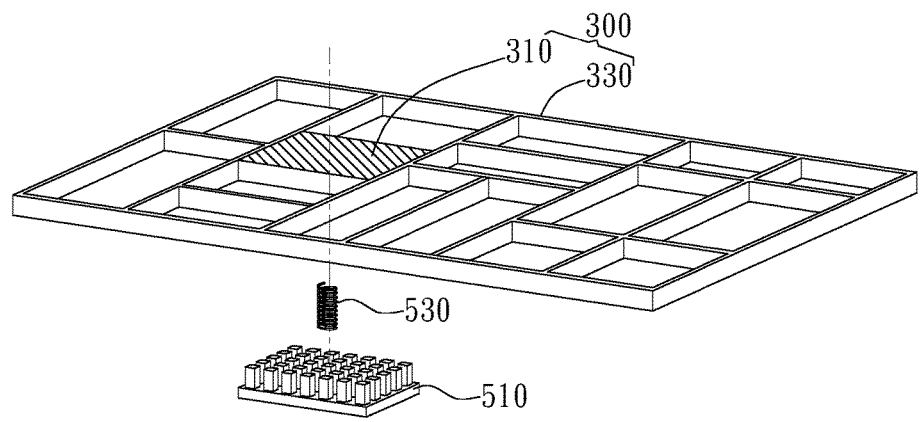
FIG. 6 is another embodiment of the support housing.

FIG. 6 illustrates another embodiment of the display device. In the embodiment shown in FIG. 6, the support housing 300 includes at least one support board 310 and support frame 330. The support board 310 is connected to the support frame 330 and is opposite to the first pressure receiving surface 513, wherein a mezzanine space 200 is present therebetween. An end of the first elastic unit 530 contacts against the support board 310 to receive support from the support board 310 in order to exert pressure towards the first heat dissipating body 510. The support board 310 at least has a side not adjacently connected to the support frame 330 while still within the range surrounded by the support frame 330. In other words, at least one side of the support board 310 will form a hollow area. Through this design of incomplete closure of the support board 310, the heat dissipating effects of the entire system may be increased while decreasing the weight of the module. In addition, the surface area of the support board 310 is preferably smaller or equal to the surface area of the first pressure receiving surface 513 or the first heat dissipating block 111 in order to provide a hallow area of greater surface area.

Figure 7:
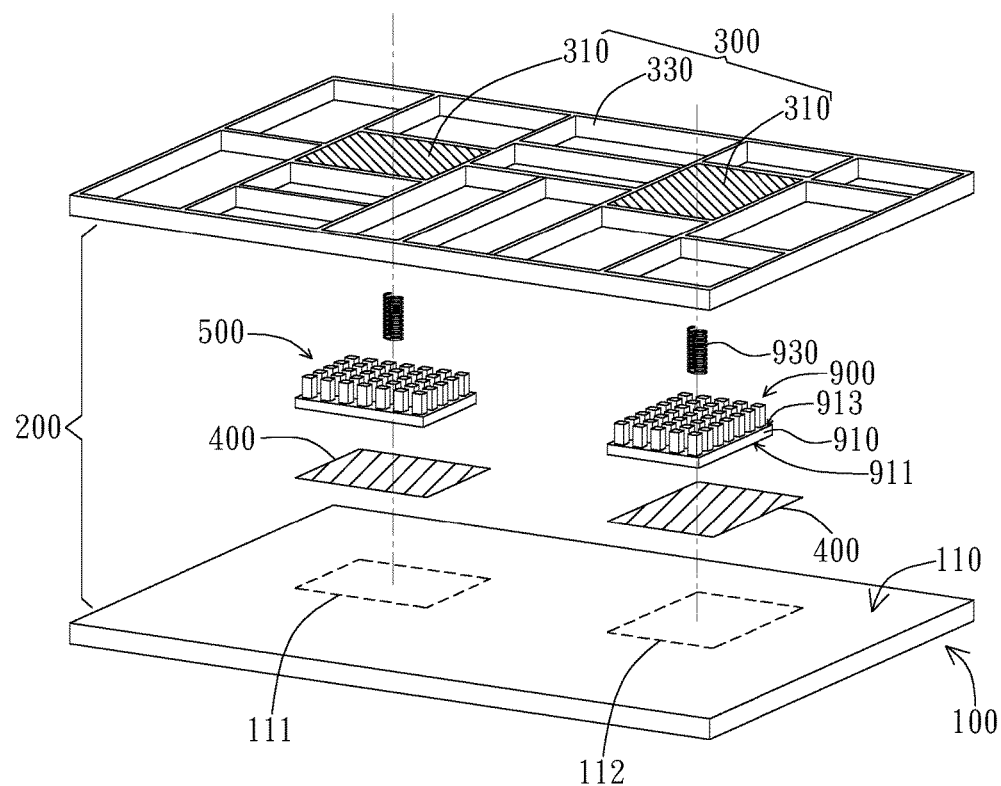
FIG. 7 is another embodiment of the display device.
Figure 8:
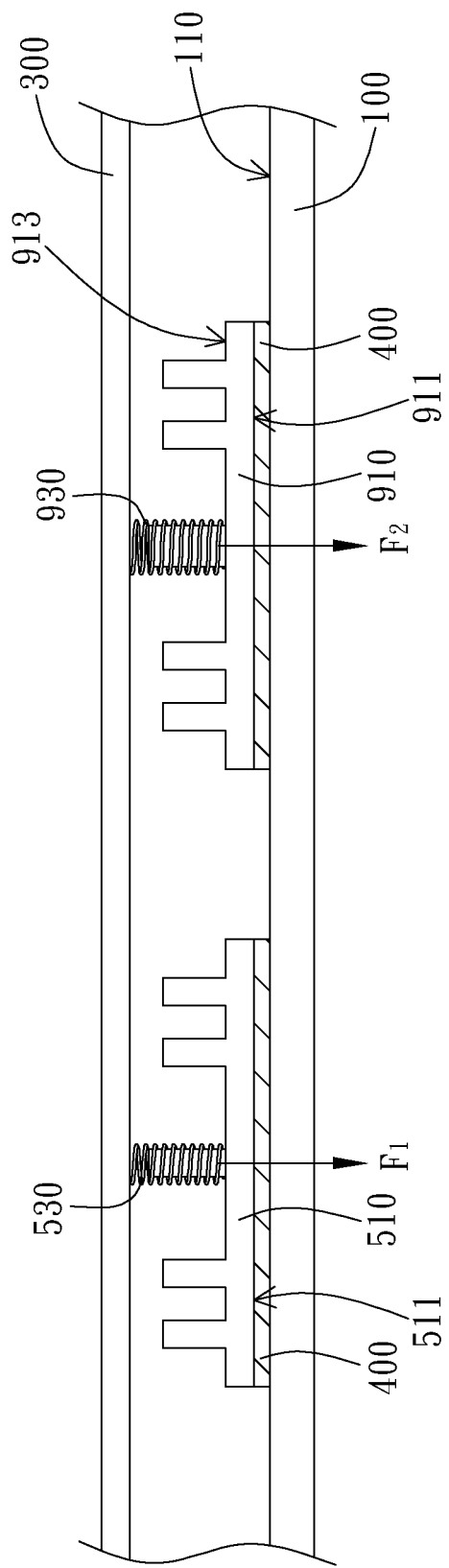
FIG. 8 is a cross-sectional view of the embodiment of FIG. 7.

FIG. 7 illustrates another embodiment of the display device. In the present embodiment, the back surface 110 includes another second heat dissipating block 112, wherein in addition to the second heat dissipating block 112 being independent from the first heat dissipating block 111, the first heat dissipating block 111 and the second heat dissipating block 112 preferably do not overlap with each other. In addition, aside from the first heat dissipating module 500, the display device can further include a second heat dissipating module 900 disposed within the mezzanine space 200 to provide heat dissipation on the second heat dissipating block 112. The second heat dissipating module 900 preferably employs a design similar to the first heat dissipating module 500, such as including heat dissipating posts 517 and the like. As shown in FIG. 7, the second heat dissipating module 900 includes a second heat dissipating body 910 and a second elastic unit 930. The second heat dissipating body 910 preferably is formed from metallic materials or any other materials with good heat transfer properties in order for heat energy to be conducted out or away from the second heat dissipating block 112. As illustrated in FIGS. 7 and 8, the second heat dissipating body 910 has a second heat exchange surface 911 and a second pressure receiving surface 913 facing away from each other, wherein the second heat exchange surface 911 can be heat exchange connected with the second heat dissipating block 112. By way of this design, heat energy generated by the display module 100 can be conducted away from the back surface 110 via the second heat exchange surface 911 and accomplish the effect of heat dissipation.

The connection between the second heat exchange surface 911 and the second heat dissipating block 122 preferably includes direct or indirect connections (for instance, through direct contact or being indirectly connected through the heat conducting medium layer 400 of the present embodiment). As shown in FIGS. 7 and 8, the second elastic unit 930 is disposed compressed between the second pressure receiving surface 913 and the support housing 300. Since the second elastic unit 930 is already pre-compressed, it has stored a potential energy and can use the support housing 300 as a source of reaction force to exert a second pressing force $F_2$ on the second pressure receiving surface 913. Through exerting the second pressing force $F_2$, the connection between the second heat exchange surface 911 and the second heat dissipating block 112 can be made tighter in order to increase the efficiency of heat transfer. In addition, in the present embodiment, the pressure tolerance levels of the first heat dissipating block 111 and the second heat dissipating block 112 are not the same. The pressure tolerance level of the second heat dissipating block 112 is greater than that of the first heat dissipating block 111. Therefore, the second pressing force $F_2$ is preferably greater than the first pressing force $F_1$. Through this design, suitable pressure may be provided in response to different pressure tolerance areas on the back surface 110 such that the heat dissipating effects may be increased while not harming or damaging the display panel 100.

In addition, in the present embodiment, a gap is preferably present between the first heat dissipating module 500 and the second heat dissipating module 900, wherein a gap also is preferably present between their respective support board 310. Through this design, air current that is dissipating heat may have better passage space to flow, and thus increase heat dissipating effects.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
 a display module having a back surface, wherein the back surface has a first heat dissipating block;
 a support housing disposed opposite the back surface and sandwiches a mezzanine space with the back surface;
 a first heat dissipating module disposed in the mezzanine space, the first heat dissipating module has:
  a first heat dissipating body having a first heat exchange surface and a first pressure receiving surface facing away from each other, wherein the first heat exchange surface is heat exchange connected to the first heat dissipating block;
  a first elastic unit disposed compressed between the first pressure receiving surface and the support housing; and
 a second heat dissipating module disposed in the mezzanine space, the second heat dissipating module has:
  a second heat dissipating body having a second heat exchange surface and a second pressure receiving surface facing away from each other, wherein the back surface includes a second heat dissipating block independent of the first heat dissipating block, and the second heat dissipating block is heat exchange connected with the second heat dissipating block;
  a second elastic unit disposed compressed between the second pressure receiving surface and the support housing;
 wherein the first elastic unit provides the first pressure receiving surface a first pressing force with the support housing as a source of reaction force, the second elastic unit provides the second pressure receiving surface with a second pressing force with the support housing as a source of reaction force, and the second pressing force is greater than the first pressing force.

2. The display device of claim 1, wherein the first heat dissipating body has a guide post disposed on the first pressure receiving surface, the first elastic unit includes a coil spring, and the coil spring is fitted on the guide post.

3. The display device of claim 1, wherein the first heat dissipating body has a plurality of heat dissipating posts disposed on the first pressure receiving surface.

4. The display device of claim 3, wherein the first elastic unit includes a coil spring, the coil spring is fitted on one of the heat dissipating posts.

5. The display device of claim 1, further including at least a position limiting unit disposed on a side of the first heat dissipating body and connected to at least one of the back surface and the support housing to limit the displacement of the first heat dissipating body on a plane dimension parallel to the back surface.

6. The display device of claim 5, wherein the position limiting unit is formed as a strip shape and extends parallel to the side of the first heat dissipating body.

7. The display device of claim 1, wherein the support housing includes at least one support board opposite to the first pressure receiving surface, and an end of the first elastic unit touches against the support board.

8. The display device of claim 1, wherein the first heat dissipating module includes at least one heat conducting medium layer disposed between the first heat exchange surface and the first head dissipating block, the heat conducting medium layer materially has respectively more elasticity relative to the first heat exchange surface and the heat dissipating block.

9. A display device, comprising:
 a display module having a back surface, wherein the back surface has a first heat dissipating block;
 a support housing disposed opposite the back surface and sandwiches a mezzanine space with the back surface;
 a first heat dissipating module disposed in the mezzanine space, the first heat dissipating module has:
  a first heat dissipating body having a first heat exchange surface and a first pressure receiving surface facing away from each other, wherein the first heat exchange surface is heat exchange connected to the first heat dissipating block;
  a guide post disposed on the first pressure receiving surface:
 a first elastic unit disposed compressed between the first pressure receiving surface and the support housing, wherein the first elastic unit includes a coil spring, and the coil spring is fitted on the guide post.

10. The display device of claim 9, further including at least a position limiting unit disposed on a side of the first heat dissipating body and connected to at least one of the back surface and the support housing to limit the displacement of the first heat dissipating body on a plane dimension parallel to the back surface.

11. The display device of claim 10, wherein the position limiting unit is formed as a strip shape and extends parallel to the side of the first heat dissipating body.

* * * * *